A. J. LOEHR.
AUTOMOBILE SIGNAL.
APPLICATION FILED APR. 27, 1918.
1,365,514.
Patented Jan. 11, 1921.
2 SHEETS—SHEET 1.
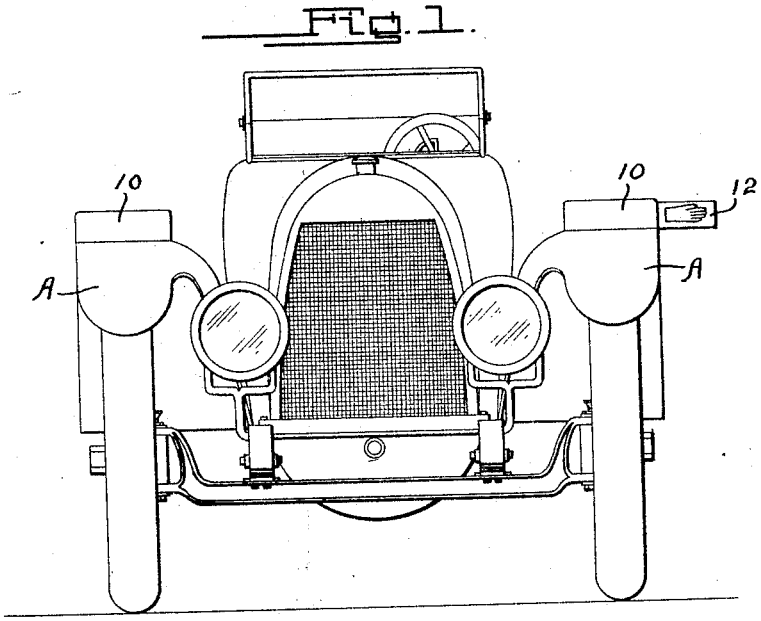
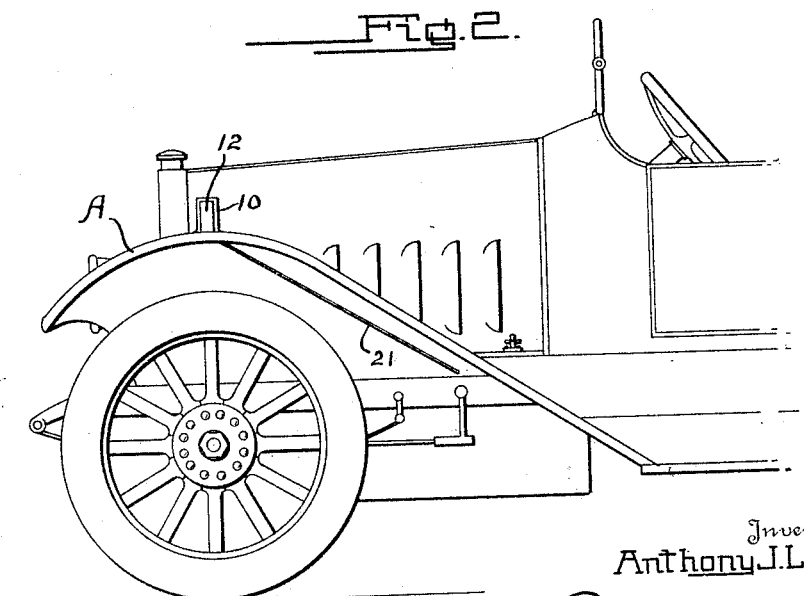
Inventor
Anthony J. Loehr.
By Lancaster Allwine
his Attorneys

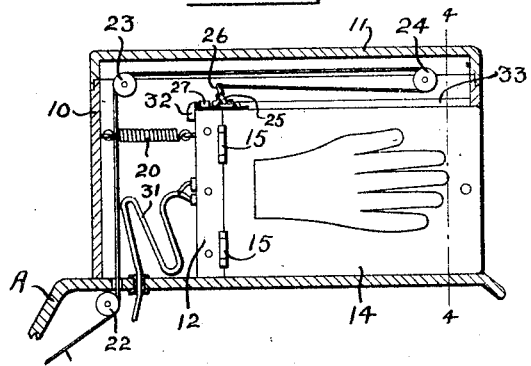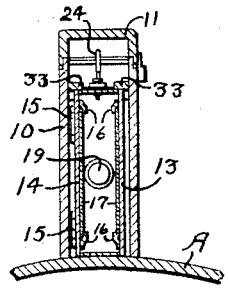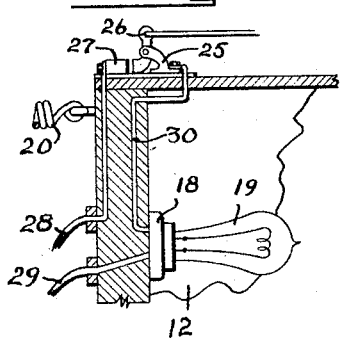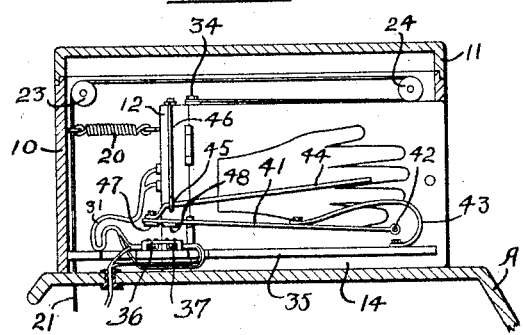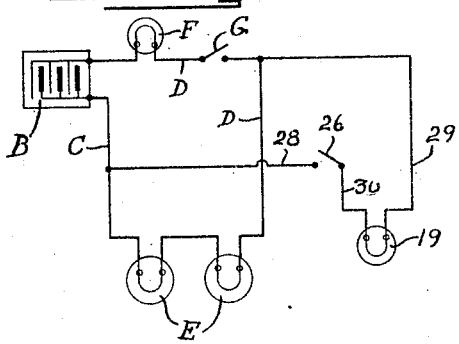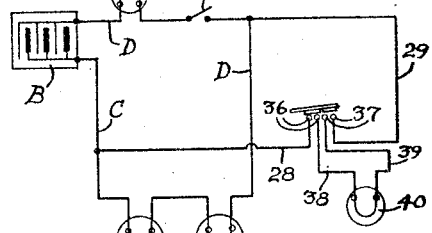

UNITED STATES PATENT OFFICE.

ANTHONY JOSEPH LOEHR, OF ASTORIA, NEW YORK.

AUTOMOBILE-SIGNAL.

1,365,514.

Specification of Letters Patent.  Patented Jan. 11, 1921.

Application filed April 27, 1918. Serial No. 231,200.

*To all whom it may concern:*

Be it known that I, ANTHONY J. LOEHR, a citizen of the United States, and a resident of Astoria, in the county of Queens and State of New York, have invented a certain new and useful Improvement in Automobile-Signals, of which the following is a specification.

The present invention relates to signals, and has more particular reference to a signal adapted for use on automobiles and like vehicles.

An object of the present invention is to provide a signal adapted to take the place of the hand of the operator of a motor vehicle to indicate the various courses of the vehicle and when the vehicle is to be brought to a stop. This object also embraces the provision of means for automatically and laterally projecting from the vehicle a suitable signal which may be visible in daylight and at night, and which consumes current only when projected or brought into an operative position.

The invention also aims at the provision of a relatively simply constructed device which may be economically manufactured and readily applied to motor vehicles of all types.

The above, and various other objects and advantages of this invention will be in part described, and in part understood, from the following detailed description of the present preferred embodiment, the same being illustrated in the accompanying drawings wherein:

Figure 1 is a front elevation of a motor vehicle having a signal constructed according to the present invention applied thereto.

Fig. 2 is a side elevation of the forward end of the vehicle, showing the application of the signal applied thereto.

Fig. 3 is an enlarged longitudinal vertical section taken through the signal.

Fig. 4 is a transverse section taken on a plane indicated by the line 4—4 in Fig. 3.

Fig. 5 is a fragmentary enlarged sectional view through the inner end of the projecting member showing the mounting of the luminous element therein and of the circuit closer and wiring therefor.

Fig. 6 is a longitudinal section through a modified form of signal constructed according to the present invention.

Fig. 7 is a diagrammatic view of a lighting circuit which may be employed in connection with the signal shown in Figs. 3, 4 and 5.

Fig. 8 is a similar view disclosing a system of circuits which may be employed in connection with the modified form of this invention illustrated in Fig. 6.

Referring to these drawings, wherein like parts are designated by similar characters of reference throughout the several views, 10 designates a casing preferably elongated and narrow, and which is adapted to be secured to the front fender or mud guard of a motor vehicle, and which is adapted to be arranged on the mud guard with its longitudinal axis transversely to the length of the vehicle. The casing 10 may be provided with a removable cap or cover portion 11 to which access may be readily gained to the interior of the casing.

Interfitting in the casing 10 is a projecting member, the same being in the form of a relatively narrow elongated casing or frame 12 the opposite sides of which are formed of transparent panels 13 and 14. The panel 14 is mounted upon hinges 15 connecting the inner end of the panel 14 to the frame and upon which the panel 14 may be swung into open and closed positions. The inner sides of the panels 13 and 14 are provided with supporting flanges 16 which detachably hold the panels 17 against the inner opposite transparent panels 13 and 14, the panels 17 having suitably formed thereon hands, as shown in Fig. 1, or other suitable designs for indicating direction and movements of the vehicle. Preferably, the panels 17 are provided with configurations of hands in such positions as to indicate to persons in vehicles in the front and rear that a stop is to be made. The slidable member or housing 12 is provided, in the inner end thereof with a lamp socket 18 into which an incandescent bulb 19 may be fitted, the latter extending forwardly between the panels 17. The frame 12 is slidably mounted to project through an opening formed in the outer end of the casing, and a spring 20 is secured to the inner end of the member or frame 12 and to the casing 10 for normally retracting the frame 12. A cable 21 is trained upwardly over pulleys 22 and 23 within the inner end of the casing 10, and is then brought forwardly through the top of the casing and over a pulley 24. The cable 21 is returned and is connected to the rear end of the frame 12. When the cable 21 is therefore drawn taut the frame 12 is slid forwardly through the box or casing 10.

The upper rear end of the frame 12 is provided with a bracket 25, as shown to advantage in Fig. 5, in which is pivotally mounted a contact arm 26, the latter projecting upwardly from the bracket 25 and having connection with the cable 21. The lower end of the arm 26 projects rearwardly and directly opposite to a fixed contact 27 which is mounted upon the frame 12. When the cable 21 is drawn taut, the arm 26 is swung forwardly at its upper end and the fixed and movable contacts are brought together to close an electric circuit through the frame.

As shown in Figs. 5 and 7, the electric circuit may comprise branch wires 30, 28 and 29, leading from the usual circuits of the vehicle. The wire 28, shown in Fig. 5, is carried upwardly through the rear end of the frame 12 and has connection with the fixed contact 27. The wire 29 leads directly through the rear end of the frame 12 and into the lamp socket 18. A connecting wire 30 leads from the opposite side of the lamp socket 18 upwardly through the frame 12 and has connection with the bracket 25. When the contacts 26 and 27 are closed, the circuit is completed through the wire 28, the contacts, the bracket 25, branch wire 30, the socket 18, connected to the lamp, and outwardly therefrom to the wire 29. As shown, the lower end of the contact 26 is weighted to normally urge the same away from the contact 27 when the cable 21 is released.

The wires 28 and 29 are inclosed in a cable 31 which is suitably coiled in the rear end of the casing 10, and which is carried downwardly therethrough and through the adjacent mud guard A to which the casing 10 may be attached. The casing 10 is provided in one side, and near its rear end, with a stop 32 against which the frame 12 is normally urged by the spring 20, and the sides of the casing 10 are also provided with inwardly extending guide flanges 33 engaging the top of the frame 12 to hold the same from upward displacement.

In the form shown in Figs. 6 and 8, showing the application of the modified form of circuit closer, the forward end of the cable 21 is secured directly to the frame 12 by means of a clamping screw 34 or the like. The inner side of the casing 10, in this instance, is provided with a ledge or support extending longitudinally in the lower part of the casing 10 and in spaced relation to the bottom thereof. Pairs of contacts 36 and 37, are mounted on the ledge, the main branch wire 28 leading to one of the contacts 36, and the opposite branch wire 29 leading to one of the contacts 37. The other contacts 36 and 37 are connected to branch wires 38 and 39 which lead to a lamp 40 supported in the casing 12 in the same manner as shown in Fig. 5. In this instance, the connecting wires 38 and 39 are arranged in the form of a slack cable adapted to admit the sliding movement of the frame 12 into and out of position.

The contacts 36 and 37 are adapted to be closed or bridged in their respective sides of the circuit by a contact arm 41 pivotally mounted at one end upon a pin 42 adjacent to the outer end of the casing 10, the arm 41 having its free end arranged in overhanging relation with respect to the contacts 36 and 37. The ledge 35 is provided at its forward end with an overhanging bowed spring 43 which has its free end fixed to the contact arm 41 and normally urges the latter upwardly out of engagement with the contacts 36 and 37. The free end of the contact arm 41 is provided with an operating stem 44 which may be in the form of a length of wire fixed upon the free end of the arm 41 and extending forwardly in overhanging relation thereto. The wire 44 is inclined upwardly in diverging relation to the arm 41, and passes through an eye 45 formed upon the lower end of a guide rod 46 secured to one side and at the inner end of the frame 12. As the wire 44 inclines upwardly, the forward movement of the frame 12 carries the eye 45 forwardly and moves the same over the rod 44, depressing the rod 44 and the arm 41 to bring a pair of contacts 47 and 48, mounted on the free end of the rod 41 into engagement with the fixed contacts 36 and 37.

In Figs. 7 and 8 the diagrams disclose the exciter B and the main fixed wires C and D which include the front and rear lamps E and F in the usual manner.

In operation, a pair of the casings 10 is mounted upon the opposite front mud guard A of a motor vehicle in such position that when the members 12 are projected from the casing 10 they may be readily observed in both front and rear of the vehicle, and may take the place of the hand of the operator for signaling to those in the front and rear of him.

When it is desired to give a signal, instead of projecting the arm and hand outwardly from the side of the vehicle, it is only necessary to draw upon the desired cable 21, the latter moving the projecting member 12 outwardly and at the same time closing the circuit through the luminous elements 19 or 40. If the main switch G of the light circuit is closed, the circuit closer arranged in the casing 10 will automatically close the circuit through the luminous element in the slidable member 12 and will thus illuminate the transparent panels so that the indications thereon will be readily observed. In placing the casing 10 upon the forward mud guards A of the motor vehicle, these direction indicating members 12 are contra-distinguished from any other indicating means, license tags or the like which may be mounted upon the rear end of the vehicle, and the members 12 take the place of the operator's hand in giving the required direction.

It is of course understood that various changes and modifications may be made in the details of construction of the above specifically described embodiment of the invention without departing from the spirit thereof, and being restricted only by the scope of the following claims.

I claim:—

1. In an auto signal, the combination of a casing, a slidable element mounted in the casing and provided with transparent sides and configurations adapted to be viewed through the sides, a spring engaging said slidable element to normally retain the same within the casing, a flexible member connected to the element and trained through the casing for projecting the slidable element when drawn taut, a lamp arranged in the slidable element, an electric circuit including said lamp, a fixed contact mounted upon the slidable element and included in one side of said circuit, a movable contact mounted on the slidable element and having connection with said flexible element and adapted to be moved into closed position upon the initial movement thereof.

2. In an auto signal, the combination of a casing, a slidable element mounted in the casing, means for projecting said slidable element, a lamp carried by the slidable element, an electric circuit including said lamp, a fixed contact mounted upon the slidable element and included in one side of said circuit, a movable contact mounted on the slidable element and having connection with said projecting means and adapted to be moved into closed position upon the initial movement thereof.

3. In an auto signal, the combination of a casing, a slidable element mounted in said casing, a flexible member connected to the element and trained through the casing for projecting the slidable element when drawn taut, means for normally retaining the slidable element within the casing, a lamp carried by the slidable element, an electric circuit including said lamp, a fixed contact mounted upon the slidable element and included in one side of said circuit, a movable contact mounted on the slidable element and having connection with said flexible element and adapted to be moved into closed position upon initial movement thereof.

ANTHONY JOSEPH LOEHR.